Figure 5:
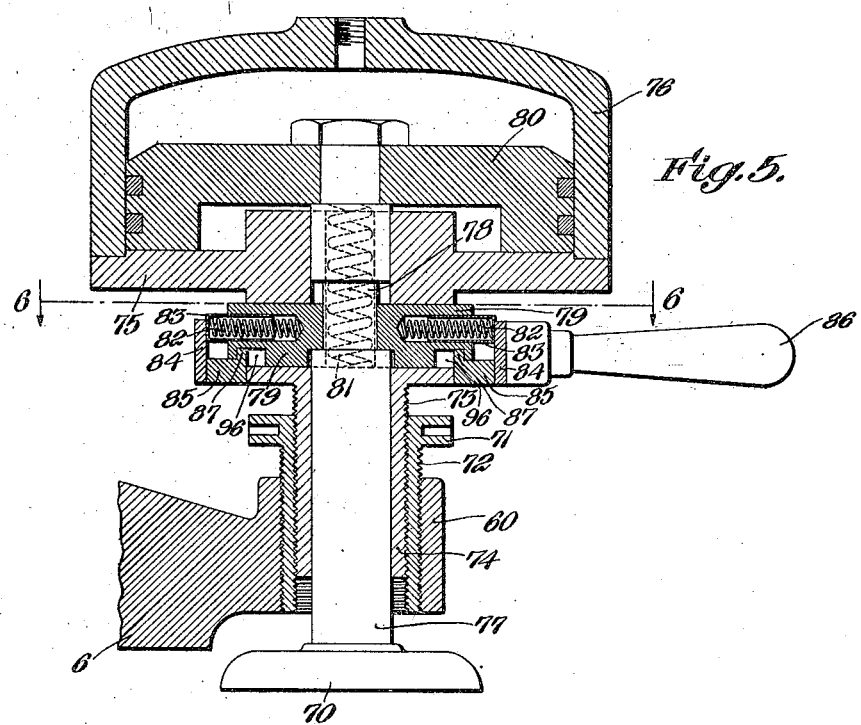

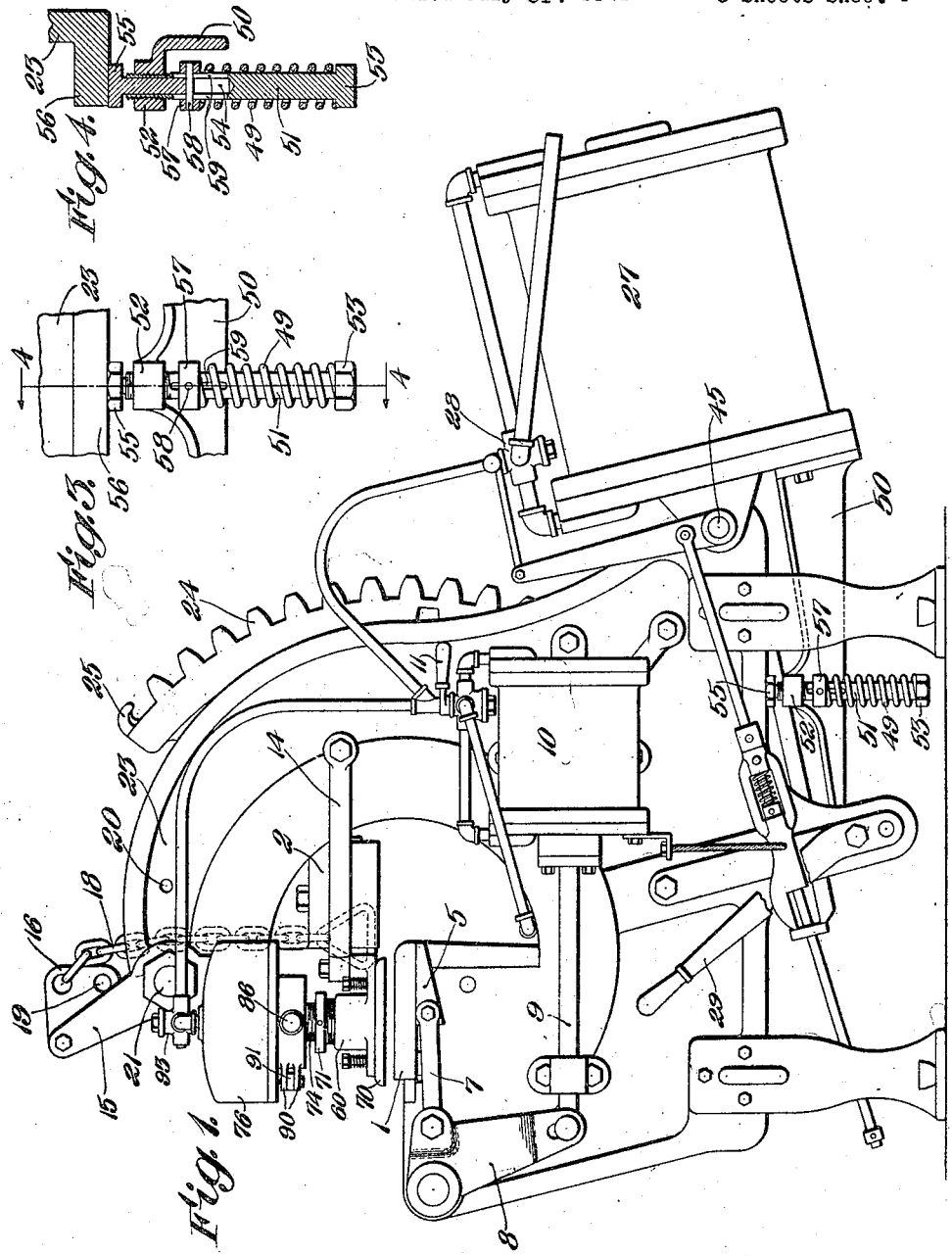

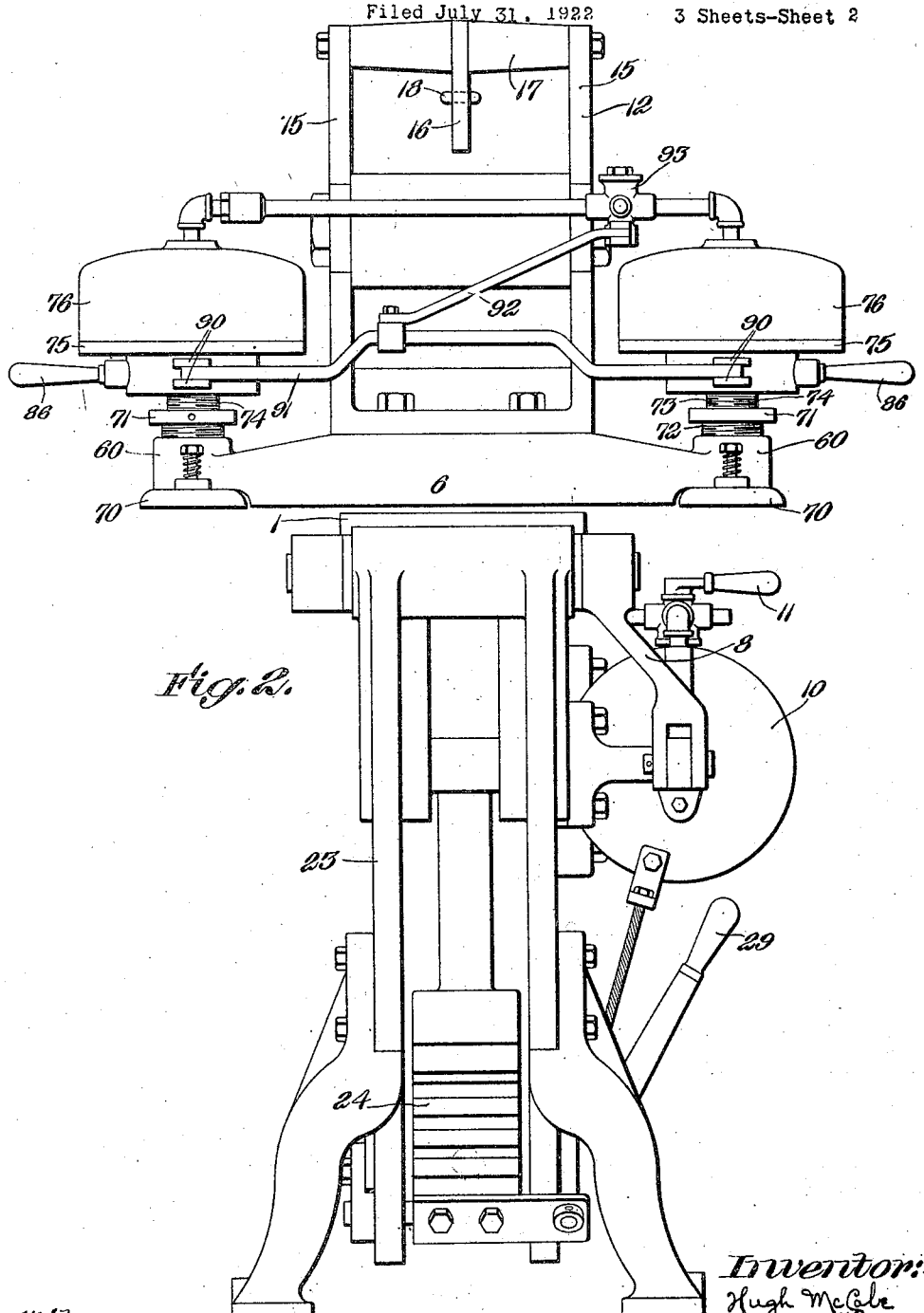

June 24, 1924.

H. McCABE 1,498,974

FLANGING MACHINE

Filed July 31, 1922 3 Sheets-Sheet 3

Witness:
Alfred H. McGlinchey.

Inventor:
Hugh McCabe
by his attorneys

Patented June 24, 1924.

1,498,974

UNITED STATES PATENT OFFICE.

HUGH McCABE, OF LAWRENCE, MASSACHUSETTS.

FLANGING MACHINE.

Application filed July 31, 1922. Serial No. 578,587.

*To all whom it may concern:*

Be it known that I, HUGH MCCABE, a citizen of the United States, residing at Lawrence, in the county of Essex and State of Massachusetts, have invented certain new and useful Improvements in Flanging Machines; and I do hereby declare the following to be a full, clear, and exact description of the invention, such as will enable others skilled in the art to which it appertains to make and use the same.

The present invention relates to an improvement in flanging machines.

In the flanging machine of the type illustrated in my Patent No. 1,006,861, is provided a straining device, as illustrated in Patent No. 1,164,732, and when designed for work on heavy plates is provided with pneumatic means for operating the straining device, as illustrated in my Patent No. 1,408,106. In raising the top clamp for the removal of flange plates from the machine, which is necessary where a continuous flange is formed on a disk, the hand lever shown in my Patent No. 1,030,416 was employed. This is the lever 14 of the Patent No. 1,164,732. With the addition of various parts including the pneumatic cylinders for operating the straining device and in machines designed for flanging heavy plates, the top clamp became excessively heavy. One object of the present invention is to provide power means for lifting the top clamp.

With the increase in size of the machine, the weight of the cylinders, piston and piston rod for operating the rack became very heavy and the packing for the piston rod was subject to severe wearing conditions. In the machine shown in my Patent No. 1,030,416, the cylinder 270 is provided with a stop screw adapted to engage the frame of the machine so as to relieve the piston rod and rack of the pressure due to the weight of the cylinder. This construction made no provision for supporting the weight of the cylinder upon the disengagement of the rack from the segment gear and while the rack and segment were disengaged, the entire weight of the cylinder was required to be carried by the piston rod and rack and during this time the piston was required to be moved into new position and then into reengagement with the rack. This motion of the piston rod under such conditions laid a heavy duty upon the packing.

Another object of the present invention is to produce a construction for supporting the cylinder not only when the rack and segment gear are engaged, but also for relieving the pressure on the piston rod when they are disengaged.

A still further object of the invention is to produce a new construction of straining mechanism simpler in form, more easily accessible and durable in operation. To the above ends, the present invention consists in the improved flanging machine hereinafter described and particularly defined in the claims.

Figure 6:
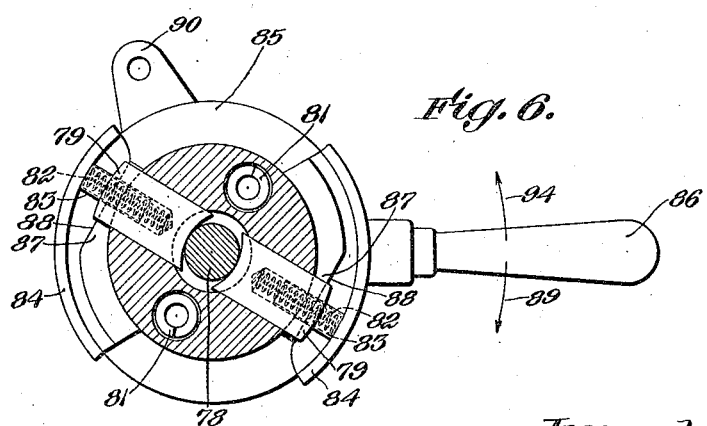

In the accompanying drawings illustrating the preferred form of the invention, Figure 1 is a side elevation of the machine; Fig. 2 is a front elevation of the same; Fig. 3 is a side elevation, on an enlarged scale, of the contrivance for supporting the bender actuating cylinder; Fig. 4 is a section on the line 4—4 of Fig. 3; Fig. 5 is a sectional elevation of one of the straining devices; and Fig. 6 is a sectional plan on line 6—6 of Fig. 5.

The illustrated embodiment of the invention is described as follows: The clamp or anvil 1 is supported by the frame of the machine and adapted to be lifted by a wedge 5 to press the work against the top clamp 6. The wedge 5 is actuated by the links 7 by which it is connected to the bell crank lever 8, in turn connected by means of the rod 9 with the piston in the clamp operating cylinder 10. A lever 11 affords means for admitting compressed air to one side or the other of the piston so as to thereby operate the wedge to lift the clamp plate 1 to clamp and hold the work or to withdraw the wedge and loosen the clamp. The top clamp 6 is carried by the top clamp carrier 12. The top clamp carrier is held in position by the bars 14 which are secured at their rear ends by bolts screwed into the frame of the machine and at their front ends by the bolts screwed into the clamp 6. By removing the bolts at the rear end of the bars 14, the top clamp carrier is free to be moved. The carrier 12 is provided with two upwardly extended arms 15. Between the upper ends of these arms is mounted a chain lever 16. The hub 17 of the chain lever 16 is pivoted on a bolt extending between the two levers 15. The bender 2 is carried by the bender segment, as in the machine of said Patent No. 1,006,861, and the latter is actuated by the segmental gear 24. On the upper end of the segmental gear 24 is mounted the chain hook 25. The chain 18 may be hooked over this hook and then actuation of the segmental gear can be forced out to lift the top clamp carrier and its associated parts on the pivot 21 on which the top clamp carrier is pivoted. The front view of the machine shown in Fig. 2 shows the extent of the apparatus comprising the top clamp straining mechanism and it is apparent that to lift this by hand would require a chain fall or some powerful lifting means. By this simple expedient of attaching the chain to the top clamp carrier levers, the top clamp is easily, quickly and conveniently lifted for the removal of the work or for other purposes. When the segment has been operated to lift the clamp carrier, it will bring the hole 19 in the chain lever 16 into a position between the two sides of the machine frame and in line with the holes 20, so that a pin may be pushed in through such holes 20 and through the hole 19 in the lever 16, whereupon the pull of the bender segment on the chain may be released and the clamp carrier and appurtenant parts will be held in elevated position and the segment may be moved to other positions without maintaining air pressure in the bender cylinder 27.

The frame members 23 carry the various parts of the machine. The bender operating cylinder 27 is supplied with compressed air and the regulating valve 28 affords provision for admitting air to one or the other sides of the bender actuating piston. The bender cylinder 27 is pivoted at 45 on the frame 23 of the machine. In this machine adapted for bending plate ¾″ in thickness, the bender cylinder is heavy, weighing some 1200 pounds. To the forward end of the cylinder is secured a bracket 50. This bracket is made double with a bracket on each side of the center line of the cylinder and at its end is provided with surfaces adapted to be engaged by the roller, such as indicated at 44 in the Patent No. 1,006,861, so that the disengagement of the rack with the bender segment by movement of the bender cylinder and segment is accomplished not only by direct engagement with the rack, as in said patent, but also by engagement with the surfaces on the brackets 50. The brackets 50 are provided with a spring contrivance which takes against the under side of the frame of the machine. These spring contrivances are illustrated in enlarged detail in Figs. 3 and 4. Each consists of a spring carrier 51 which is screw threaded on its upper end and screwed into the boss 52 on the bracket 50. The head 53 of the spring carrier 51 is adapted to receive a wrench so that it may be turned in the boss 52 to increase or decrease the spring pressure for the purpose hereinafter described. The upper end of the spring carrier 51 is bored at 54 to receive the shank of the spring pin 55, the upper end of which takes against the flange 56 on the frame of the machine. The spring pin 55 is slidingly mounted in the spring carrier 51. Loosely mounted on the spring carrier 51 is the collar 57, which forms the upper abutment for the spring 49. A drive pin 58 is received in holes in the collar 57, and extends from side to side of the collar through the slots 59 in the walls of the spring carrier 51. This drive pin receives the pressure of the spring pin 55, and through the pin and collar the pressure is transmitted to the spring 49. The spring carrier is turned in the boss 52 of the bracket 50 to adjust the pressure on the spring and the correct adjustment is that in which the pressure exerted by the spring pin on the spring is sufficient to about counterbalance the weight of the bender cylinder 27 and connected parts. In such adjustment the operator, by pulling upon the hand lever 29, will raise or lower the bender segment and move it into or out of mesh with the segmental gear without the exertion of great force owing to the counterbalanced condition of the bender cylinder. This feature of the machine prolongs the life of the packing for the rack piston rod because it relieves such packing of the excessive pressures which would otherwise be brought upon it by the great weight of the bender cylinder 27, which, in a machine of the size above referred to weighs some half ton. It also facilitates manipulation of the machine because it relieves the operator of the necessity of exerting great force upon the lever for swinging the bender cylinder and rack.

The straining device comprises working cylinders mounted on each end of the top clamp. By reference to Fig. 2, it will be seen that at each end of the clamp 6 there is provided a bracket 60 for supporting the straining device which comprises means for actuating the swivel bearing plates 70 to strain the plate by pressure on opposite sides of the work clamp after the clamp has been closed. The straining device is raised and lowered to position it correctly by means of the adjusting sleeve 71 which is screw-threaded into the ends of the bracket 60, being provided on its outer surface with a right hand thread 72 and on its inner surface with a left hand thread. The latter thread engages the outer threaded surface 73 of the sleeve 74 extending downwardly from the cylinder head 75 of the working cylinder 76. In the McCabe Patent No. 1,408,106, vertical adjustment of the straining means was secured by turning the whole cylinder around, but in the present construction the working cylinders are held fast and by turning the adjusting sleeve 71 in one direction or the other, the straining device may be raised and lowered without turning it on its own axis. The plunger 77 is adapted to reciprocate in the sleeve 74 and is necked down at 78 to afford a surface against which two locking bolts 79 may take. Above the necked down portion 78 of the plunger 77 the plunger extends upwardly to the piston 80 to which it is secured in the usual manner. The working cylinder 76 is secured to the cylinder head 75 in the usual manner. Two springs 81 are received in two holes in the cylinder head and they bear at their lower ends upon the bottoms of the holes in which they are received and they press at their upper ends against the under side of the piston 80. These springs, therefore, normally tend to hold the piston and its plunger 77 in raised position. When air is admitted to the top of the working cylinder 76 it depresses the piston and forces the plunger downwardly. The bolts 79 are pressed inwardly by springs 82 received in spring cups 83 which are supported in holes in the bolts 79 and normally tend to press the bolts inwardly. The outer ends of the spring cups 83 engage the flanges 84 which are secured to and rise from the bolt plates 85. To the bolt plate is secured the handle 86 which may conveniently be called the straining device operating lever. The bolts 79 are provided with grooves 96 on their under sides which receive cams 87. These cams 87 have an inclined surface 88 which is so constructed that when the operating handle 86 is moved in the direction of the arrow 89, the surface 88 will withdraw the bolts from their inward position. When the lever is moved in the opposite direction, the bolts will be permitted (but not compelled) to move inwardly. The two bolt plates 85 are each provided with an ear 90 and the two ears are connected by the link 91, which link in turn is connected by a link 92 with the straining device air valve 93. By moving the operating lever 86 in the direction of the arrow 94, the air valve 93 will be operated to admit air to the working cylinders 76 and the pistons 80 and plungers 77 will be depressed. The same movement of the operating lever 86 withdraws the cams 87 from in front of the bolts 79 and permits them to be forced inwardly by their springs. The action of the straining plungers is not instantaneous because it is required that it should strain the plate being operated upon, consequently the first throw of the handle in the direction of the arrow 94 to cause the straining devices to be operated will release the bolts at the same time the air is admitted to the working cylinders. Then when the work cylinder pistons have been depressed to the extent of their throw, the bolts 79 will snap inwardly to engage the shoulders on the plungers 77. Thereupon the operating lever 86 may be moved backwardly in the direction of the arrow 89, a little, sufficient to close the air valve 93 and thereafter the straining plunger 77 is held down by the bolts. After the bender has operated and it is desired to release the straining device, the operating lever 76 will be moved in the direction of the arrow 89, the bolts will be withdrawn and the pistons will be raised by their springs. It will be observed that the means for holding the plungers of the straining device in straining position are independent of the continuance of pressure in the working cylinders 76. It is also to be noted, that the position of the working cylinders and associated parts is not affected by vertical adjustment of their positions.

Having thus described the invention, what is claimed is:

1. A flanging machine having, in combination, a bender, bender actuating means, top and bottom clamp members, means for operating the clamp members to close them to clamp and hold the work during bending, and to open them to permit movement of the work to present successive portions to the bender, and mechanical means for moving one of the clamp members to a position of clearance after the completion of the flanging operation to permit removal of the work.

2. A flanging machine as defined in claim 1 having means for holding the clamp member in position of clearance.

3. A flanging machine having, in combination, a bender, a work clamp consisting of top and bottom members, one of the members being immovable during the entire flanging operation, a straining device carried by the said work clamp member, and mechanical power means for moving the work clamp member carrying the straining device to permit removal of the work after the completion of the flanging operation.

4. A flanging machine having, in combination, a bender, a work clamp member comprising top and bottom members, a straining device connected to one of the members, mechanical power means for moving the work clamp member provided with the straining device and means for holding such member after it has been moved.

5. A flanging machine having, in combination, a bottom clamp member, a top clamp member, a bender, means for loosening the lower clamp member to present successive increments of work to the bender to form a flange, the top clamp member being immovable during the flanging operation, and power means for moving the top clamp member to permit removal of the work on the completion of the flanging operation.

6. A flanging machine having, in combination, a bender, a work clamp comprising two members, one of which is movable for removing the work, a straining device carried by said movable member and mechanical power means for moving said member and holding it after it has been moved.

7. A flanging machine having, in combination, a bender, bender actuating means, top and bottom clamp members, means for operating one of the clamp members to close them to clamp and hold the work during bending and to open them to permit movement of the work to present successive portions to the bender, means for holding the other clamp member immovable during the flanging operation, and mechanical means for moving one of the clamp members to a position of clearance after the completion of the flanging operation to permit removal of the work.

8. A flanging machine having, in combination, a bender, bender actuating means, a bottom clamp member, a top clamp member which is immovable during the entire flanging operation, connections between the bender actuating means and the top clamp member for moving the latter after completion of the flanging operation to permit removal of the work and a pin for holding such clamp member in position after it has been moved.

9. A flanging machine having, in combination, a bender, bender actuating means, a work clamp comprising two members, one of which is movable to permit the removal of work from the machine and provided with a straining device and chain connections between the bender actuating means and such movable clamping member.

10. A flanging machine having, in combination, a bender, bender actuating means, a work clamp comprising two members, one of which is movable to permit removal of work from the machine and provided with a straining device, connections between the bender actuating means and the movable clamp member for moving the latter and means for holding it after it has been moved.

11. A flanging machine having, in combination, an anvil over which the flange is turned, means for holding the work against the anvil during the entire flanging operation, a bender for bending the flange on the work, actuating means for the bender and connections between such actuating means and the holding means for yieldingly actuating the latter to move it to permit withdrawal of work from the machine.

12. A flanging machine having, in combination, means for holding the work, a bender, a bender segment carrying the bender provided with a segmental gear, a bender cylinder, a piston in the cylinder, a rack connected with the piston and arranged to be engaged and disengaged from the bender segment and counterbalancing means for counterbalancing the weight of the cylinder.

13. A flanging machine having, in combination, means for holding the work, a bender, a bender segment for carrying the bender provided with a segmental gear, a rack, a movable bender cylinder, a piston in the cylinder, a piston rod extending from the piston to the rack and means for yieldingly supporting the cylinder so as to relieve the piston rod of the duty of supporting the cylinder.

14. A flanging machine having, in combination, means for holding the work, a bender, a bender segment carrying the bender and provided with a segmental gear, a rack and a bender cylinder provided with a piston rod connected with the rack, such cylinder, piston rod and rack being pivotally supported to permit engagement and disengagement of the rack with the segmental gear, and a spring device for supporting the rack and cylinder.

15. A flanging machine having, in combination, means for holding the work, a bender, bender actuating means comprising a segmental gear and rack, means for engaging and disengaging the rack and the gear, a cylinder, a piston in the cylinder rigidly connected with the rack, said cylinder being pivotally supported to engage and disengage the rack and segmental gear and means for counterbalancing the cylinder and piston so as to permit the engagement and disengagement of the rack with the gear without the exertion of great force.

16. A flanging machine having, in combination, means for holding the work, a bender, a segmental gear carrying the bender, a rack for actuating the segmental gear having a less number of teeth than the segmental gear, said rack and gear having provision for engagement of the rack with different portions of the segmental gear, a cylinder, a piston rigidly connected with the rack for actuating it, said cylinder, piston and rack being pivotally supported so as to permit the engagement and disengagement of the rack with the segmental gear and yielding means for balancing such pivotally supported cylinder, piston and rack so as to permit easy movement thereof for engagement and disengagement of the rack with the gear.

17. A flanging machine having, in combination, means for flanging the work, a straining device having a work engaging member, locking means for locking the straining device, actuating means for the straining device, and connections between the locking means and the actuating means.

18. A flanging machine having, in combination, means for flanging the work, a straining device, controlling means for the straining device, locking means for the straining device, and an operating lever for actuating both the controlling means and locking means.

19. A flanging machine having, in combination, means for flanging the work, a straining device, actuating means for the straining device comprising an operating lever, locking means for locking the straining device in its work straining position and connections between the locking means and the actuating means such that the operating lever renders the locking means operative at the same time that it sets the straining device in operation.

20. A flanging machine having, in combination, work holding means, a straining device for straining the work, flanging means, locking means for locking the straining device in work holding position, actuating means for the straining device and an operating lever for controlling the actuation of the straining device and the locking means.

21. A flanging machine having, in combination, work holding means, flanging means, a straining device comprising means on opposite sides of the work holding means for transversely straining the edge of the plate, means for adjusting the two straining means independently of each other, means for actuating such straining means, means for locking the straining means in work straining position, and an operating lever for setting the actuating means in operation and rendering the locking means inoperative.

22. A flanging machine having, in combination, work holding means, flanging means, work straining means for transversely straining the edge of the plate while the flanging means is operating, locking means for holding the straining means in work straining position, and manually operated lock releasing means.

HUGH McCABE